United States Patent
Ruhoff

(10) Patent No.: US 8,387,267 B1
(45) Date of Patent: Mar. 5, 2013

(54) TOOLS AND METHODS FOR LOCATING A BLIND HOLE

(75) Inventor: Bernard L. Ruhoff, Stanwood, WA (US)

(73) Assignee: The Boeing Company, Chicago, IL (US)

( * ) Notice: Subject to any disclaimer, the term of this patent is extended or adjusted under 35 U.S.C. 154(b) by 102 days.

(21) Appl. No.: 13/208,862

(22) Filed: Aug. 12, 2011

(51) Int. Cl.
*G01B 5/00* (2006.01)

(52) U.S. Cl. ............................................ 33/644; 33/613
(58) Field of Classification Search .................. 333/644, 333/613, 645, 666, 671
See application file for complete search history.

(56) References Cited

U.S. PATENT DOCUMENTS

| | | | |
|---|---|---|---|
| 2,844,977 A | 7/1958 | Morse | |
| 4,328,621 A | 5/1982 | Benjamin | |
| 4,506,448 A | 3/1985 | Topping et al. | |
| 5,175,940 A | 1/1993 | Naill et al. | |
| 5,404,641 A | 4/1995 | Bratten et al. | |
| 6,813,843 B1 | 11/2004 | Faubion | |
| 7,329,076 B2 * | 2/2008 | Hartney et al. | 33/644 |
| 7,472,493 B2 * | 1/2009 | Schmier et al. | 33/613 |
| 2008/0289207 A1 * | 11/2008 | Schmier et al. | 33/671 |

* cited by examiner

*Primary Examiner* — Yaritza Guadalupe-McCall
(74) *Attorney, Agent, or Firm* — Armstrong Teasdale LLP

(57) ABSTRACT

A tool for use in locating a blind hole defined in a workpiece is provided. The tool includes a first leg including a first end, a second end opposite the first end, and an aperture defined therethrough and proximate the first end of the first leg. The tool further includes a second leg substantially parallel to the first leg and defining a space therebetween, the second leg including a first end, a second end opposite the first end, a pin aligned with the aperture and proximate the first end of the second leg, the pin configured for insertion into the blind hole, and at least one sensor proximate the pin and configured to detect a contact with the workpiece. The tool further includes a body portion extending between and coupling the second end of the first leg to the second end of the second leg.

20 Claims, 4 Drawing Sheets

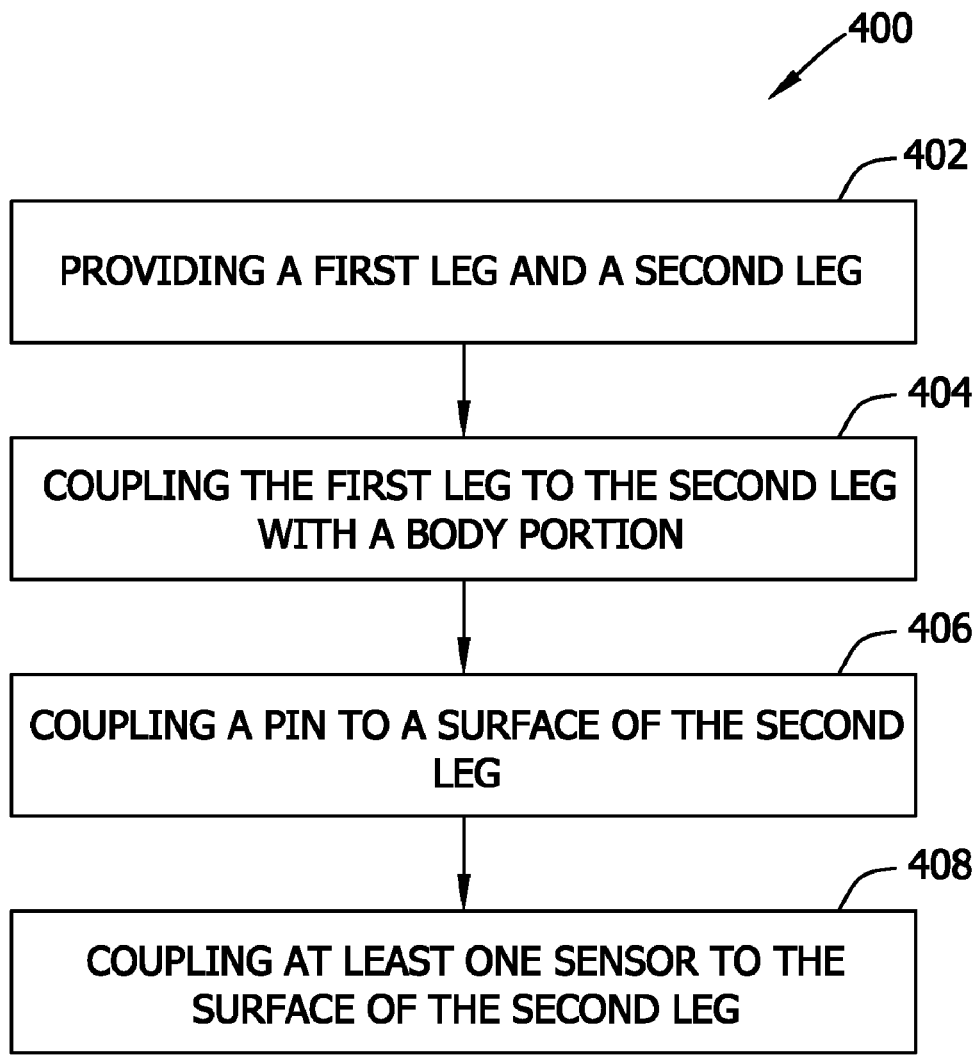

TOOLS AND METHODS FOR LOCATING A BLIND HOLE

BACKGROUND

The field of the disclosure relates generally to fabricating workpieces, and more specifically, to locating blind holes in workpieces.

Many industries, such as the aerospace industry, involve fabricating, and/or reworking various workpieces to build a finished product and/or device. For the purposes of assembling the finished product and/or device, it is often desirable to locate one or more blind holes in the workpieces. For example, it may be necessary to drill a hole through one workpiece that is aligned with a blind hole in another workpiece. It may also be necessary to drill a blind hole in one side of a workpiece that is aligned with a blind hole on an opposite side of the same workpiece.

However, depending on the size, shape, and/or orientation of particular workpieces, determining the location and orientation of a blind hole may be relatively difficult. Further, while at least some known tools aid a user in locating a blind hole, at least some known tools must be removed before a new hole is drilled. After the blind hole location tool is removed the position of the workpiece may shift before the new hole is drilled. Accordingly, using at least some known tools, even when a user initially determines the location of a blind hole, the user may still drill the new hole in the wrong location after the tool is removed.

BRIEF DESCRIPTION

In one aspect, a tool for use in locating a blind hole defined in a workpiece is provided. The tool includes a first leg including a first end, a second end opposite the first end, and an aperture defined therethrough and proximate the first end of the first leg. The tool further includes a second leg substantially parallel to the first leg and defining a space therebetween, the second leg including a first end, a second end opposite the first end, a pin aligned with the aperture and proximate the first end of the second leg, the pin configured for insertion into the blind hole, and at least one sensor proximate the pin and configured to detect a contact with the workpiece, contact between the sensor and the workpiece thereby indicating the pin is operatively placed within the blind hole. The tool further includes a body portion extending between and coupling the second end of the first leg to the second end of the second leg.

In another aspect, a method for locating a blind hole defined in a workpiece is provided. The method includes aligning a pin of a tool with the blind hole in the workpiece, the tool including a first leg that includes an aperture aligned with the pin and defined through the first leg proximate a first end of the first leg, and a second leg substantially parallel to the first leg and defining a space therebetween, the second leg including the pin proximate a first end of the second leg, the tool further including a body portion coupling a second end of the first leg to a second end of the second leg. The method further includes inserting the pin into the blind hole such that at least one sensor located proximate the pin comes into contact with a surface of the workpiece, and receiving an indication, based on the sensor contact, that the pin is operatively positioned within the blind hole.

In yet another aspect a method for assembling a tool for use in locating a blind hole in a workpiece is provided. The method includes coupling a first end of a first leg to a first end of a second leg with a body portion, such that the first leg is substantially parallel to the second leg and defines a space therebetween, the first leg including an aperture defined therethrough and proximate a second end of the first leg, coupling a pin to a surface of the second leg proximate to a second end of the second leg such that the pin is aligned with the aperture, and coupling at least one sensor to the surface of the second leg proximate to the second leg second end, the at least one sensor configured to detect a contact with the workpiece thereby indicating the pin is operatively placed within the blind hole.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 4 is a flowchart of an exemplary method for assembling a tool that may be used to assemble the tool shown in FIG. 1.

DETAILED DESCRIPTION

The systems and methods described herein facilitate locating a blind hole in a workpiece. A tool for locating the blind hole includes a first leg and a substantially parallel second leg. The second leg includes a pin that inserts into the blind hole. The second leg also includes at least one sensor that detects a contact with the workpiece that indicates when the pin is properly inserted into the blind hole. When the pin is properly inserted into the blind hole, an aperture defined through the first leg facilitates drilling a hole that is aligned with the blind hole, either in the workpiece including the blind hole, or a separate workpiece.

Figure 1:
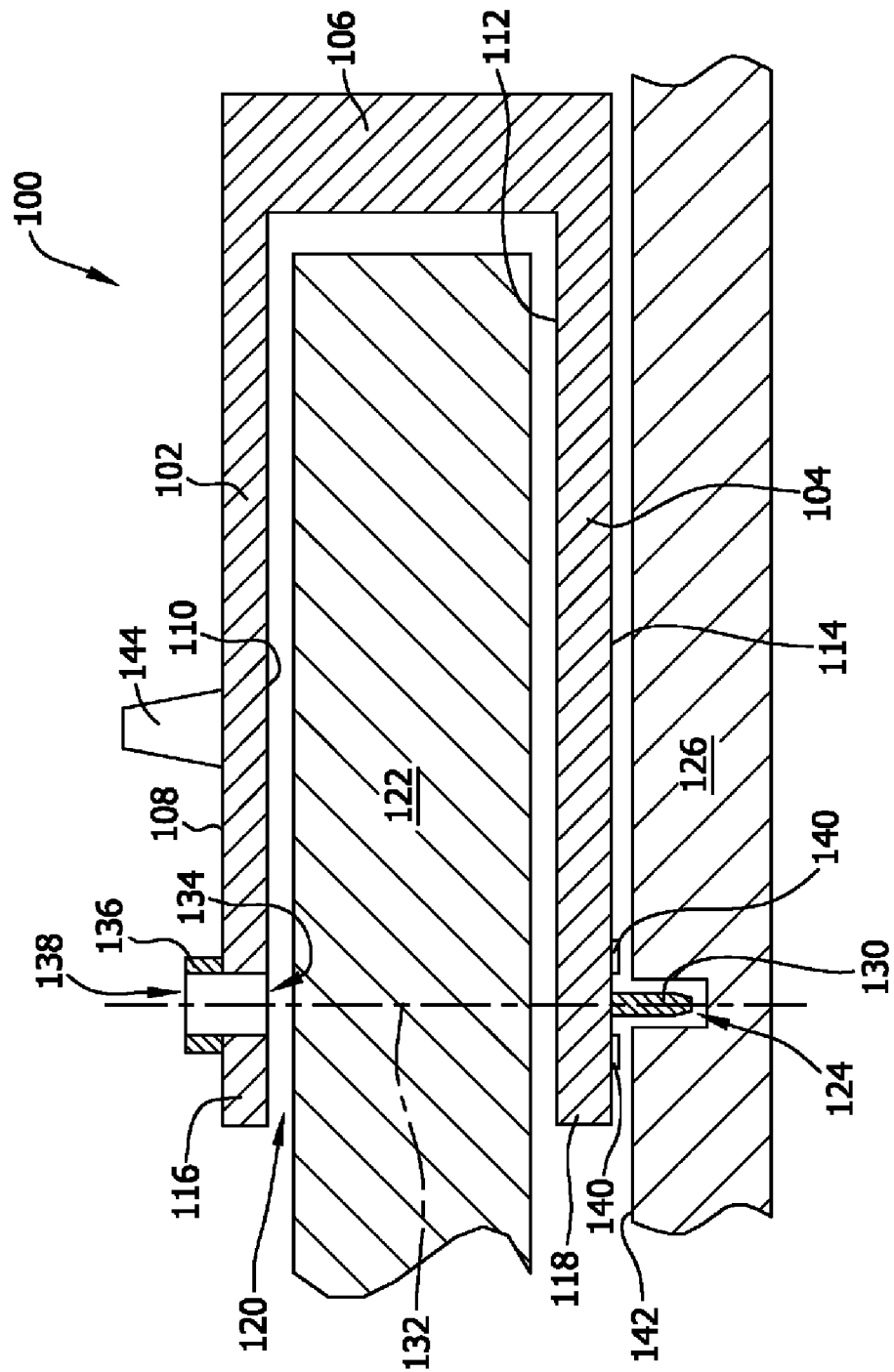
FIG. 1 is a schematic cross-sectional view of an exemplary tool.

FIG. 1 is a schematic cross-sectional view of an exemplary blind hole location tool 100. Tool 100 includes a first leg 102, a second leg 104 and a body portion 106 that extends between and connects first leg 102 and second leg 104. First leg 102 includes an exterior surface 108 and an interior surface 110 opposite exterior surface 108. Similarly, second leg 104 includes an interior surface 112 and an exterior surface 114 opposite interior surface 112. First leg 102 includes a first foot 116, and second leg 104 includes a second foot 118. In the exemplary embodiment, tool 100 is substantially u-shaped.

First leg 102 is substantially parallel to second leg 104, such that exterior surface 108, interior surface 110, interior surface 112, and exterior surface 114 are all substantially parallel to one another. Interior surface 110 of first leg 102, body portion 106, and interior surface 112 of second leg 104 form a slot 120. Slot 120 receives a first workpiece 122 through which a hole is to be drilled, as described in detail below. First workpiece 122 is any material and/or component through which a hole can be drilled, including, but not limited to a metal, plastic, and/or ceramic material. Tool 100 facilitates drilling a hole (not shown) through first workpiece 122 such that the hole in first workpiece 122 is aligned with a blind hole 124 defined in a second workpiece 126, as described in detail below.

In the exemplary embodiment, second foot 118 includes a pin 130 extending from exterior surface 114. Pin 130 may be formed integrally with second foot 118 or may be a separate component coupled to exterior surface 114. Pin 130 inserts into blind hole 124 in second workpiece 126. An axis 132 is defined through the center of pin 130. Pin 130 is substantially cylindrical in the exemplary embodiment. Alternatively, pin 130 has any shape that enables tool 100 to function as described herein.

On first leg 102, an aperture 134 is defined through first foot 116. Aperture 134 extends from exterior surface 108 to interior surface 110. Further, aperture 134 is aligned with axis 132. Accordingly, aperture 134 is aligned with pin 130. In the exemplary embodiment, first foot 116 includes a bushing 136 extending from exterior surface 108. Bushing 136 may be formed integrally with first foot 116 or may be a separate component coupled to exterior surface 108. Bushing 136 includes a bushing aperture 138 defined therethrough. Bushing aperture 138 is aligned with aperture 134 and axis 132. Bushing aperture 138 provides a guide for a drilling tool, as described in detail below.

Second foot 118 includes a plurality of sensors 140 on exterior surface 114. In the exemplary embodiment, second foot 118 includes three sensors 140. As three sensors 140 on exterior surface 114 define a plane, sensors 140 facilitate detecting a planar contact with surface 142. As blind hole 124 is defined in surface 142, when surface 142 contacts all three sensors 140, pin 130 is substantially orthogonal to surface 142, and pin 130 is therefore properly inserted into and aligned in blind hole 124. While tool 100 includes three sensors 140 in the exemplary embodiment, second foot 118 may alternatively include any number of sensors 140 that enable tool 100 to function as described herein.

In the exemplary embodiment, sensors 140 are pressure sensors, such as piezoelectric, piezoresistive, capacitive, and/or elastoresistive sensors. Alternatively, sensors 140 are any type of sensor that enables tool 100 to function as described herein. Sensors 140 are electrically coupled to an indicator 144. When surface 142 of second workpiece 126 contacts sensors 140, indicator 144 facilitates alerting a user of the contact. In the exemplary embodiment, indicator 144 is a light-emitting diode (LED) that turns on when sensors 140 are triggered. Alternatively, indicator 144 is any device that facilitates alerting a user that sensors 140 are in contact with surface 142 of second workpiece 126, and accordingly, that pin 130 is substantially orthogonal to surface 142 and is properly inserted in blind hole 142. For example, in some embodiments, indicator 144 is a speaker that emits a predetermined sound when exterior surface 114 contacts surface 142. Indicator 144 is coupled to exterior surface 108 of first leg 102 in the exemplary embodiment. Alternatively, indicator 144 may be located at any position on tool 100 that enables tool 100 to function as described herein.

In the exemplary embodiment, where second foot 118 includes three sensors 140, indicator 144 only turns on when all of sensors 140 are triggered. Accordingly, if only one of three sensors 140 are triggered (i.e., pin 130 is not properly inserted into blind hole 124), indicator 144 is not activated. Alternatively, in some embodiments, indicator 144 is activated when any of sensors 140 are triggered. Further, in some embodiments, each sensor 140 includes a separate indicator 144 that indicates whether the associated sensor 140 is triggered.

In operation, tool 100 facilitates locating blind hole 124 in second workpiece 126 and drilling a hole (not shown) through first workpiece 122 that is aligned with blind hole 124. Specifically, tool 100 and/or second workpiece 126 are positioned with respect to one another such that pin 130 is inserted into blind hole 124 on second workpiece 126. Once pin 130 is inserted into blind hole 124, tool 100 and/or second workpiece 126 are positioned such that surface 142 contacts sensors 140. A user can determine whether pin 130 is properly inserted within blind hole 124 by observing indicator 144. With pin 130 inserted into blind hole 124 and substantially orthogonal to surface 142 such that pin 130 is properly inserted in blind hole 124, the hole can be drilled in first workpiece 122.

Bushing 136 provides a guide for a drilling tool used to drill the hole in first workpiece 122. Specifically, at least part of a drilling tool, such as a drill bit, is inserted through bushing aperture 138 and aperture 134 to drill into first workpiece 122. As bushing aperture 138 and aperture 134 in first foot 116 are aligned with pin 130 along axis 132, the hole drilled in first workpiece 122 is aligned with blind hole 124.

Figure 2:
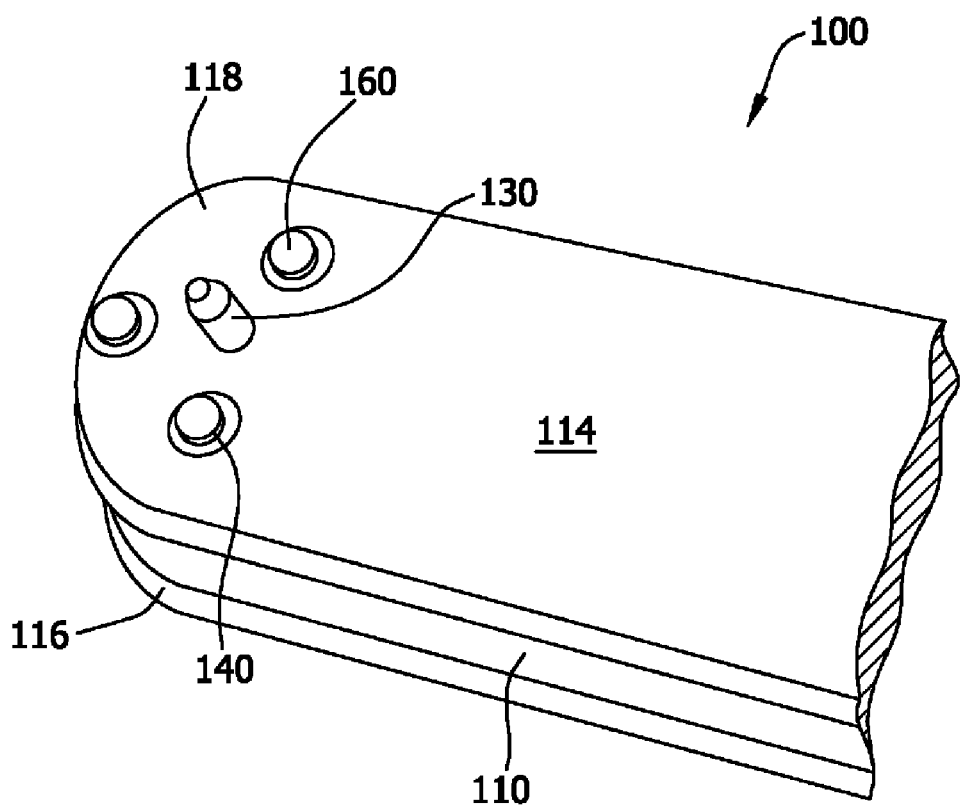
FIG. 2 is a partial perspective view of the tool shown in FIG. 1.

FIG. 2 is a partial perspective view of tool 100. In the exemplary embodiment, first foot 116 and second foot 118 each have a semi-circular shape. Alternatively, first foot 116 and second foot 118 have any shape that enables tool 100 to function as described herein and indicator 144 is activated, as described above.

As shown in FIG. 2, sensors 140 are arranged on exterior surface 114 around pin 130. In the exemplary embodiment, sensors 140 are substantially equidistant from each other in a triangular arrangement. Alternatively, sensors 140 may be arranged in any suitable arrangement that enables tool 100 to function as described herein. In the embodiment shown in FIG. 2, each sensor includes a switch 160. When switch 160 is activated, for example, by contact with surface 142 of second workpiece 126, the corresponding sensor 140 is triggered.

Figure 3:
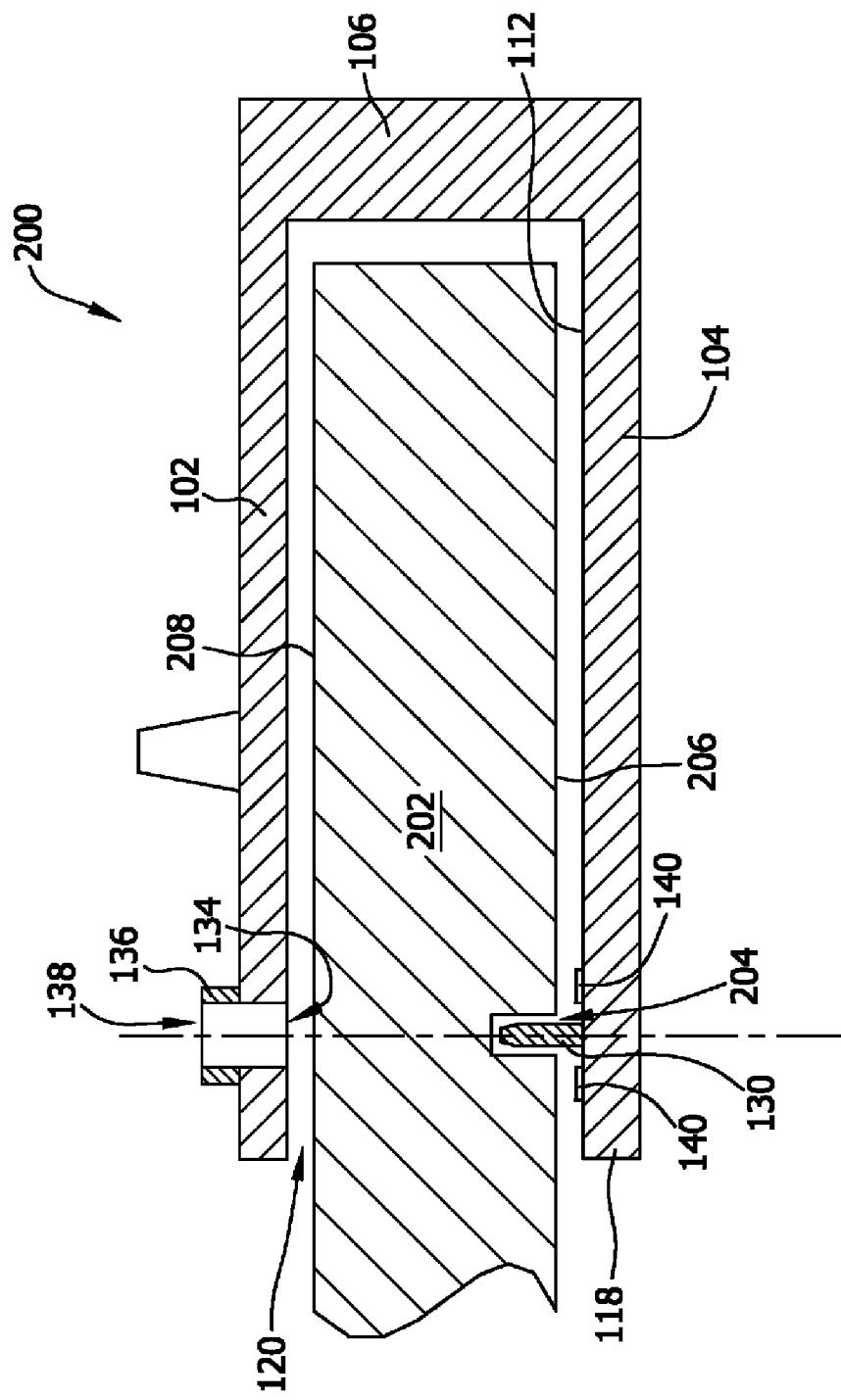
FIG. 3 is a schematic cross-sectional view of an alternative tool.

FIG. 3 is a schematic cross-sectional view of an alternative tool 200. Like reference numerals in FIG. 3 refer to like parts in tool 100 (shown in FIG. 1). Similar to tool 100, tool 200 includes pin 130 and sensors 140. However, pin 130 and sensors 140 extend from interior surface 112 of second foot 118. Accordingly, when a workpiece 202 is inserted into slot 120, pin 130 fits into a blind hole 204 defined in a lower surface 206 of slot 120. Sensors 140 and indicator 144 indicate whether pin 130 is substantially orthogonal to lower surface 206. While in the embodiment shown in FIG. 3, only one workpiece 202 is inserted into slot 120, in some embodiments, two or more workpieces may be inserted into slot 120.

When pin 130 is inserted into blind hole 204 and lower surface 206 contacts sensors 140, first leg 102 facilitates drilling a hole (not shown) in an upper surface 208 of workpiece 202 such that the drilled hole is aligned with blind hole 204. Specifically, to drill into workpiece 202, at least part of a drilling tool, such as a drill bit, is inserted through bushing aperture 138 and aperture 134. As bushing aperture 138 and aperture 134 in first foot 116 are aligned with pin 130 along axis 132, the hole drilled in upper surface 208 of workpiece 202 is aligned with blind hole 204 defined in lower surface 206. In the exemplary embodiment, aperture 134 and bushing aperture 138 are substantially cylindrical. Alternatively, aperture 134 and bushing aperture 138 are any shape that enables tool 100 to function as described herein.

FIG. 4 is a flowchart of an exemplary method 400 of assembling a tool for use in locating a blind hole, such as tool 100 and blind hole 124. Method 400 includes providing 402 a first leg and a second leg, such as first leg 102 and second leg 104. The first leg includes an aperture defined therethrough, such as aperture 134. The first leg is coupled 404 to the second leg with a body portion, such as body portion 106, such that the first leg and the second leg are substantially parallel to one another and define a space therebetween. A pin, such as pin 130 is coupled 406 to a surface of the second leg, such as interior surface 112 or exterior surface 114. The pin is aligned with the aperture in the first leg. At least one sensor, such as sensor 140, is coupled 408 to the surface of the second leg. The sensor detects a contact with a surface of a workpiece, such as surface 142 of workpiece 126. The detected contact indicates the pin is operatively placed within the blind hole. Using the systems and methods described herein, the assembled tool facilitates locating a blind hole and drilling a hole that is aligned with the blind hole.

The embodiments described herein facilitate locating a blind hole in a workpiece. A tool for locating the blind hole includes a first leg and a substantially parallel second leg. The second leg includes a pin that inserts into the blind hole. The second leg also includes at least one sensor that detects a contact with the workpiece that indicates when the pin is properly inserted into the blind hole. When the pin is properly inserted into the blind hole, an aperture defined through the first leg facilitates drilling a hole that is aligned with the blind hole, either in the workpiece including the blind hole, or a separate workpiece.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A tool for use in locating a blind hole defined in a workpiece, said tool comprising:
    a first leg comprising:
        a first end;
        a second end opposite said first end; and
        an aperture defined therethrough and proximate said first end of said first leg;
    a second leg substantially parallel to said first leg and defining a space therebetween, said second leg comprising:
        a first end;
        a second end opposite said first end;
        a pin aligned with said aperture and proximate said first end of said second leg, said pin configured for insertion into the blind hole; and
        at least one sensor proximate said pin and configured to detect a contact with the workpiece, contact between said sensor and the workpiece thereby indicating said pin is operatively placed within the blind hole; and
    a body portion extending between and coupling said second end of said first leg to said second end of said second leg.

2. A tool in accordance with claim 1, wherein said pin and said at least one sensor are coupled to an exterior surface of said second leg such that said pin extends away from said first leg.

3. A tool in accordance with claim 1, wherein said pin and said at least one sensor are coupled to an interior surface of said second leg such that said pin extends toward said first leg.

4. A tool in accordance with claim 1, wherein said at least one sensor comprises a plurality of sensors placed about said pin and configured in combination to detect a substantially planar contact with a surface of the workpiece.

5. A tool in accordance with claim 1, further comprising at least one indicator electrically coupled to said at least one sensor, said indicator configured to activate when said at least one sensor detects a contact with the workpiece.

6. A tool in accordance with claim 1, wherein said first leg further comprises a bushing coupled to a surface of said first leg and comprising a bushing aperture defined therethrough, said bushing aperture aligned with said aperture and configured to receive at least a portion of a drilling tool.

7. A tool in accordance with claim 1, wherein an interior surface of said first leg, said body portion, and an interior surface of said second leg form a slot configured to receive the workpiece.

8. A method for locating a blind hole defined in a workpiece, said method comprising:
    aligning a pin of a tool with the blind hole in the workpiece, the tool including a first leg that includes an aperture aligned with the pin and defined through the first leg proximate a first end of the first leg, and a second leg substantially parallel to the first leg and defining a space therebetween, the second leg including the pin proximate a first end of the second leg, the tool further including a body portion coupling a second end of the first leg to a second end of the second leg;
    inserting the pin into the blind hole such that at least one sensor located proximate the pin comes into contact with a surface of the workpiece; and
    receiving an indication, based on the sensor contact, that the pin is operatively positioned within the blind hole.

9. A method in accordance with claim 8, wherein inserting the pin comprises inserting the pin such that the at least one sensor comes into contact with a surface of a first workpiece, said method further comprising:
    inserting a second workpiece into a slot defined by the first leg, the body portion, and the second leg; and
    drilling, using the aperture defined through the first leg, a hole in the second workpiece, the drilled hole aligned with the blind hole in the first workpiece.

10. A method in accordance with claim 8 further comprising:
    inserting the workpiece into a slot defined by the first leg, the body portion, and the second leg; and
    drilling, using the aperture defined through the first leg, a hole in the workpiece, the drilled hole aligned with the blind hole.

11. A method in accordance with claim 8, wherein aligning a pin of a tool comprises aligning a pin that extends toward the first leg from an interior surface of the second leg.

12. A method in accordance with claim 8, wherein aligning a pin of a tool comprises aligning a pin that extends away from the first leg from an exterior surface of the second leg.

13. A method in accordance with claim 8, wherein aligning a pin of a tool comprises aligning a pin of a tool that includes a plurality of sensors about the pin configured in combination to detect a substantially planar contact with the surface of the workpiece.

14. A method in accordance with claim 8 wherein receiving an indication comprises activating at least one indicator electrically coupled to the at least one sensor when the at least one sensor detects a contact with the surface of the workpiece.

15. A method for assembling a tool for use in locating a blind hole in a workpiece, said method comprising:
 coupling a first end of a first leg to a first end of a second leg with a body portion, such that the first leg is substantially parallel to the second leg and defines a space therebetween, the first leg including an aperture defined therethrough and proximate a second end of the first leg;
 coupling a pin to a surface of the second leg proximate to a second end of the second leg such that the pin is aligned with the aperture; and
 coupling at least one sensor to the surface of the second leg proximate to the second leg second end, the at least one sensor configured to detect a contact with the workpiece thereby indicating the pin is operatively placed within the blind hole.

16. A method in accordance with claim 15, further comprising electrically coupling an indicator to the at least one sensor, the indicator configured to activate when the at least one sensor detects a contact with the workpiece.

17. A method in accordance with claim 15, further comprising coupling a bushing to the first leg, the bushing including a bushing aperture defined therethrough, the bushing aperture aligned with the aperture and configured to receive at least a portion of a drilling tool.

18. A method in accordance with claim 15, wherein coupling a pin comprises coupling the pin to an exterior surface of the second leg such that the pin extends away from the first leg, and wherein coupling at least one sensor comprises coupling the at least one sensor to the exterior surface of the second leg.

19. A method in accordance with claim 15, wherein coupling a pin comprises coupling the pin to an interior surface of the second leg such that the pin extends towards the first leg, and wherein coupling at least one sensor comprises coupling the at least one sensor to the interior surface of the second leg.

20. A method in accordance with claim 15, wherein coupling at least one sensor comprises coupling a plurality of sensors to the surface of the second leg about the pin, the sensors configured in combination to detect a substantially planar contact with the workpiece.

* * * * *